United States Patent [19]

Gabara et al.

[11] Patent Number: 6,014,037

[45] Date of Patent: *Jan. 11, 2000

[54] METHOD AND COMPONENT ARRANGEMENT FOR ENHANCING SIGNAL INTEGRITY

[75] Inventors: Thaddeus John Gabara, Murray Hill; Robert E. Rudnick, Glen Rock, both of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/825,288

[22] Filed: Mar. 27, 1997

[51] Int. Cl.[7] .................................................. H03K 17/16
[52] U.S. Cl. .............................................. 326/30; 326/21
[58] Field of Search ................................. 326/30, 82, 86, 326/90, 21, 22; 327/110, 111, 311; 333/124, 32

[56] References Cited

U.S. PATENT DOCUMENTS

| | | | |
|---|---|---|---|
| 5,095,285 | 3/1992 | Khatibzadeh | 330/306 |
| 5,523,703 | 6/1996 | Yamamoto et al. | 326/30 |
| 5,596,285 | 1/1997 | Marbot et al. | 326/30 |
| 5,686,872 | 11/1997 | Fried et al. | 326/30 |
| 5,731,711 | 3/1998 | Gabara | 326/30 |

*Primary Examiner*—Michael Tokar
*Assistant Examiner*—Don Phu Le
*Attorney, Agent, or Firm*—John M. Harman

[57] ABSTRACT

Embodiments of the invention include a method and arrangement of integrated circuit components for enhancing the integrity of communication signals transmitted through a multi-device communication system. Embodiments of the invention provide controllable impedance arrangements for coupling to one or more integrated circuit components coupled along a bus transmission line within the communications system. The coupled impedance arrangements establish damping impedances for selected devices between the signal transmitting component and the signal receiving component along the bus transmission line to advantageously reduce distortion and ringing associated with the LC parasitic network behavior of the devices. Typically, a damping impedance is coupled to the integrated circuit component immediately adjacent to the signal transmitting component along the bus transmission line between the signal transmitting component and the signal receiving component. Alternatively, other integrated circuit components between the signal transmitting component and the signal receiving component have damping impedances coupled thereto in addition to or instead of the integrated circuit component adjacent to the signal transmitting component. According to an embodiment of the invention, the controllable damping impedance arrangements are on-chip and off-chip configurations of switchable impedance elements that when actuated couple the necessary impedance to the characteristic capacitance and associated inductance of selected integrated circuit components. The damping impedance arrangements are controlled by a controller operably coupled to the arrangement or by other suitable means. Implementation of the damping impedance arrangements advantageously improves the integrity of signals transmitted along the bus transmission line and reduces ringing without unnecessarily increasing power dissipation and/or driving power requirements of the signal transmitting components within the communications system.

12 Claims, 3 Drawing Sheets

METHOD AND COMPONENT ARRANGEMENT FOR ENHANCING SIGNAL INTEGRITY

BACKGROUND OF THE INVENTION

1. Field of the Invention

The invention relates to component communication systems. More particularly, the invention relates to integrated circuits within component communication systems.

2. Description of the Related Art

Integrated circuit chips and arrangements thereof having the ability to provide inter-component communications at higher speeds and with lower power dissipation has always been a goal for integrated circuit chip and system manufacturers. Integrated circuit transistors are capable of providing a switching performance for high speed data transmission that is greater than the ability of common wire interconnectors to convey such data between integrated circuit chips. For example, the switching performance of metal oxide semiconductor transistors having gatewidths of 1 $\mu$m or less produces data for transmission at rates on the order of 1 Gbits/s, which exceeds the capabilities of conventional interconnects such as dual-in-line packages, stitch-bond wires and conventional metal traces on printed circuit boards.

However, certain problems tend to arise when operating at such data transmission rates. For example, at data rates as low as 100 Mbits/s, discontinuities at the interconnect cause a problem of reflecting a portion of a transmitted data signal back to the transmitter integrated circuit. Such signal reflection often destructively combines with the transmitted signal to degrade the signal received by a destination integrated circuit.

Transmission line structures have been employed for interconnects in systems to reduce such discontinuities. In such systems, discrete terminating resistors often are coupled to ends of the transmission line. The terminating resistor has an impedance that matches the characteristic impedance of the transmission line in order to substantially reduce discontinuities and corresponding signal reflections caused by the ends of the transmission line. However, the use of permanent terminating resistors at the ends of the transmission lines causes, inter alia, increased power dissipation.

In conventional communications bus arrangements, i.e., arrangements in which a plurality of integrated circuits or components are coupled to the same signal transmission line or bus, the integrity of transmitted signals often becomes distorted, particularly at their leading and trailing edges despite the use of terminating resistors for the transmission line. Moreover, signals transmitted on the transmission line also suffer from ringing. Such distortion and ringing of data signals often disadvantageously degrade detection and discrimination of the data represented thereby.

Accordingly, there is a need for an integrated circuit communications system and/or method that reduces distortion and ringing of communication signals transmitted along a bus transmission line while also reducing driver power requirements caused by increased power dissipation.

SUMMARY OF THE INVENTION

The invention is embodied in a method and arrangement of integrated circuits or electronic components for enhancing the integrity of communication signals transmitted within a multi-component communication system. Embodiments of the invention employ controllable damping impedance arrangements for coupling to one or more integrated circuit components that are coupled along a bus transmission line within the communications system. The invention is based on the realization that each component connection to a communication bus effectively acts as an LC parasitic network that substantially produces the previously described distortion and ringing. The controllable damping impedance arrangements establish effective impedances for selected components between the signal transmitting component and the signal receiving component along the bus transmission line to advantageously reduce such distortion and ringing associated with the LC parasitic network behavior of the components. In accordance with another aspect of the invention, a damping impedance typically is coupled to the integrated circuit component immediately adjacent to the signal transmitting component along the bus transmission line between the signal transmitting component and the signal receiving component. Alternatively, other components between the signal transmitting component and the signal receiving component have damping impedances coupled thereto in addition to or instead of the integrated circuit component adjacent to the signal transmitting component. According to embodiments of the invention, the controllable damping impedances are configurations of switchable impedance elements, either on-chip or off-chip, that when actuated couple the necessary impedance to the characteristic capacitance and inductance of select integrated circuits. The appropriate damping impedances are determined and controlled by a controller operably coupled to the arrangement. Implementation of the damping impedance arrangements advantageously improves the integrity of signals transmitted along the bus transmission line and reduces ringing with little if any increased power dissipation and/or required driving power of the signal transmitting components within the communications system.

DETAILED DESCRIPTION

In the following description similar components are referred to by the same reference numeral in order to simplify the understanding of the drawings.

Embodiments of the invention are based on the realization that in communication bus arrangements (i.e., arrangements in which a plurality of integrated circuit components are coupled to the same signal transmission line or bus), integrated circuit components have an inherent capacitance and inductance and their interconnects have an associated inductance that collectively act as a characteristic LC parasitic network such as an LC tank or tuning circuit with a characteristic input impedance. The characteristic LC parasitic network energizes itself by extracting energy of particular spectral components from signals transmitted along the transmission line. A portion of the extracted energy initially distorts the integrity of the transmitted signal, particularly at its leading and trailing edges, and once the characteristic LC parasitic network is charged, the extracted energy subsequently is discharged and propagated along the transmission line, thus producing ringing along the transmission line.

Furthermore, coupling various damping impedances to one or more select integrated circuit components between the signal transmitting component and the signal receiving component improves signal integrity and reduces ringing on the transmission line. Power dissipation and driving power requirements are reduced compared to many conventional arrangements with similar signal integrity and only slightly higher than other conventional arrangements with much greater signal distortion and ringing.

For purposes of discussion herein, a damping impedance is understood to include impedances whose value is selected to reduce signal distortion, e.g., of the kind caused by the energization of the characteristic LC parasitic network of integrated circuit components, as discussed previously herein. Also, as discussed hereinabove, since at least one cause of ringing is the initial energization of the characteristic LC parasitic network in the integrated circuit, damping impedances reduce ringing.

The damping impedances are provided, e.g., through the actuation of controllable impedance elements coupled to the integrated circuit. More specifically, the ability to selectively or switchably couple a damping impedance to an integrated circuit, is built into one or more if not all of the integrated circuit components that are to be part of the communications system. The selectivity of the damping impedances is controlled, e.g., by a controller, processor or line arbitrator operably coupled thereto, or by an integrated circuit transistor arrangement such as disclosed in U.S. Pat. No. 5,243,229.

Figure 1:
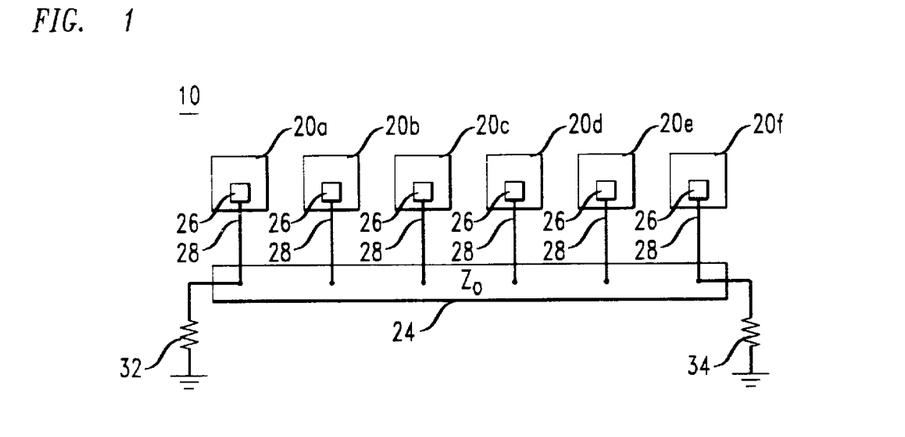
FIG. 1 is a schematic diagram of a conventional communications system having a plurality of integrated circuit components coupled to a communications system bus transmission line.

FIG. 1 shows a conventional, bi-directional communications system 10 including a plurality of integrated circuit components $20_a$, $20b$, $20_c$, $20_d$, $20_e$ and $20_f$ connected to a bus transmission line 24 having a characteristic impedance $Z_0$. Components $20_a$–$20_f$ are, e.g., analog or digital integrated circuit components, discrete processing components or other components that are capable of transmitting a signal to, or otherwise detecting a signal from, a transmission line or bus 24. For purposes of discussion herein, the term "transmission line", "bus" or "bus transmission line" refers to any wiring that is capable of transmitting a signal from one point to another, substantially regardless of the ratio of the signal velocity to the signal frequency.

Typically, integrated circuit components $20_a$–$20_f$ have input-output regions (shown generally as 26) and corresponding interconnects 28 (also known as "stubs") for coupling components $20_a$–$20_f$ to bus transmission line 24. Input-output regions 26 provide operable connection between components 20 and external circuitry. More specifically, input-output regions 26 provide operable connection to output drivers within components 20 for transmitting signal information and to input buffers within components 20 for receiving transmitted signal information.

In operation, the bus arrangement as shown allows any of the components $20_a$–$20_f$ to communicate with any of the other components, assuming that the communicating components have the ability to transmit and receive signals. In a point-to-point transmission arrangement (not shown), there is only a transmitting component and a receiving component, with no component along the bus transmission line therebetween. However, in typical bus arrangements, it is possible for signals transmitted by a signal transmitting component (e.g., component $20_a$) to bypass one or more components (e.g., components $20_b$–$20_e$) before being received by the desired signal receiving component (e.g., component $20_f$).

The conventional communications system 10 shown in FIG. 1 also includes a pair of terminating resistors 32, 34, connected, e.g., as shown between bus 24 and a voltage source such as ground, as shown, or a power supply. Terminating resistors 32, 34 typically are coupled to the end components of communications system 10 (i.e., components $20_a$ and $20_f$), and each resistor has an impedance that matches the characteristic impedance (e.g., $Z_0$) of bus 24.

In this manner, terminating resistors 32, 34 substantially reduce undesirable reflections of signals transmitted along bus 24. Such reflections, which are caused by discontinuities at the connections between bus 24 and component interconnections 28 and to a certain extent by impedance mismatch, tend to degrade the integrity of the signals being transmitted along bus 24.

Integrated circuit (IC) components $20_a$–$20_f$ typically include a package containing one or more semiconductor IC chips often coupled to leads and a lead frame for connecting to external circuitry. The lead frame includes a paddle for mounting the semiconductor chip thereon and a plurality of leads around the paddle. The semiconductor chip has a plurality of connecting terminals (often referred to as bonding pads) for connecting to corresponding leads via metal bonding wires. Electrostatic discharge (ESDs) devices are formed in the semiconductor chip near the bonding pads for providing electrostatic protection.

In typical plastic IC packages, a mold resin material seals the semiconductor chip and at least the metal bonding wires and portion of the lead frame connected to the semiconductor chip terminals, and the unsealed portion of the leads (i.e., the legs) are used for connection to external circuitry. In packages such as ball grid array (BGA) packages and pin grid array (PGA) packages, the metal bonding wires often are unsealed.

The integrated circuit component has associated with it a characteristic input impedance that derives its capacitance and/or inductance values from most if not all of the component elements. For example, the bonding pad has a capacitance of approximately 1 pF (picofarad) and the ESD has a capacitance of approximately 1.5 pF. Similarly, the lead frame has an inductance of approximately 4–15 nH (nanohenries). Also, the bonding wire from the bonding pad to the lead frame contributes approximately 2 nH to the overall input impedance of the integrated circuit package.

Figure 2:
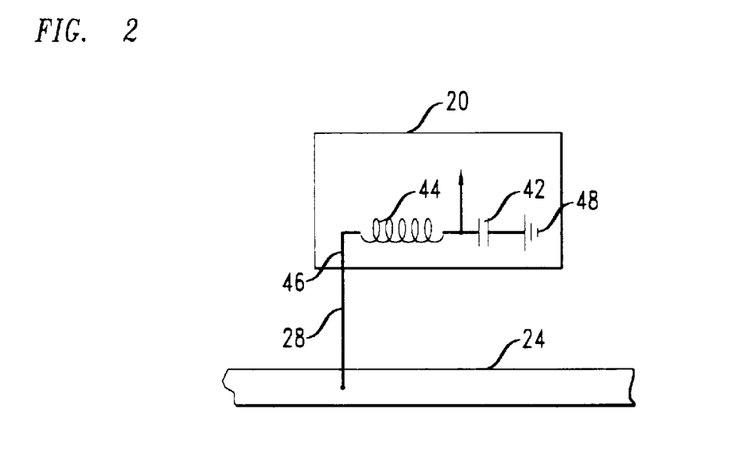
FIG. 2 is a schematic diagram of an integrated circuit component coupled to a communications system bus transmission line showing a conventional model of the characteristic capacitance and inductance of the integrated circuit component.

FIG. 2 depicts the characteristic input impedance of one of the IC components 20 shown in communications system 10 of FIG. 1 as modeled in a conventional manner. A characteristic capacitance 42 and inductance 44 are modeled as shown within component 20 between an interface (shown generally as 46) and a voltage source 48, which is, e.g., the ground potential of component 20 (i.e., chip ground) or any power supplies applied to component 20. In general, interface 46 couples external circuitry to component 20 via interconnection 28. Although interconnection 28 actually may have an inductance and/or capacitance associated therewith, it is assumed for purposes of discussion herein that any inductance and/or capacitance associated with interconnection 28 has been represented in the capacitance 42 and inductance 44.

The characteristic capacitance and inductance contributions of integrated circuit component 20 function as an LC parasitic network such as an LC tank or tuning circuit having a characteristic input impedance as seen from bus 24. As discussed previously herein, the LC parasitic network energizes itself by extracting energy of particular spectral components from signals transmitted along the transmission line, which tends to distort the integrity of the transmitted signal, especially at the leading and trailing edges of the signal. Furthermore, an energized LC parasitic network causes ringing along bus transmission line 24 when the LC parasitic network subsequently discharges the extracted energy and propagates it along bus transmission line 24.

Also, it should be understood that the integrated circuit components shown herein have a single stub 28 connected thereto only for illustrative purposes. It is possible for integrated circuit components to be connected to a plurality of bus transmission lines via a corresponding number of stubs for communicating in accordance with this invention. Furthermore, it should be understood that it is possible for the integrated circuit components to be disposed on a substrate, e.g., a printed circuit board or multi-device module, which maintains the structure of the bus transmission line.

Figure 3:
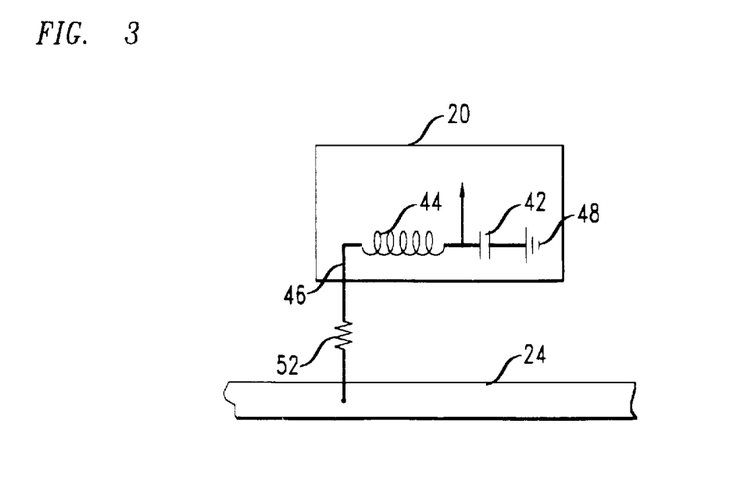
FIG. 3 is a schematic diagram of the integrated circuit component model of FIG. 2 showing the addition of a terminating impedance according to a conventional arrangement.

Conventional methods such as the Stub Series Terminated Logic (SSTL) standard connect a resistor 52 in series with stub 28 of all integrated circuit components coupled to bus 24, as shown in FIG. 3, for the purpose of isolating the interconnects from the transmission line. However, arrangements of this kind have several problems. First, having resistance 52 connected in series with an IC component 20 requires an undesirable increase in driving power when that component is transmitting signal information along bus 24 relative to systems without such resistances. Thus, for bi-directional communications systems (such as communications system 10), the driving power of all IC components within the system must be increased. Moreover, increasing the driving power also increases the size of the driver and thus the area usage on the IC, increases the power dissipated therefrom and increases the switching noise.

Also, every resistor connected in series with an integrated circuit component 20 dissipates power, including the resistors coupled to integrated circuit components along the bus that may not be transmitting or receiving signal information at a given time, resulting in unnecessary power dissipation within the communications system. However, in such conventional arrangements, the unnecessary power dissipation cannot be eliminated, because disabling a series-connected resistor will disable the interface (and thus the entire integrated circuit component) from the communications system.

According to an embodiment of the invention, controllable damping impedance elements associated with integrated circuit components coupled to a bus are selectively actuated to reduce the previously described, undesirable LC parasitic network effects thereof. Embodiments of the invention advantageously include controllable impedance elements for providing the damping impedance to at least an integrated circuit component coupled to the bus at an adjacent connection point relative to the connection point of the signal transmitting component and between the signal transmitting component and the signal receiving component. Also, embodiments of the invention provide a method that determines the respective damping impedance values of the respective integrated circuit components and that selectively actuates the controllable impedance elements in accordance therewith.

More specifically, particular embodiments of the invention are based on the realization that, if the communications system is configured in such a way that most if not all of the integrated circuit components along the bus between the signal transmitting component and the signal receiving component are similar in characteristic input impedance, then actuating a damping impedance associated with the integrated circuit component coupled to the bus at a connection point that is adjacent to the connection point of the signal transmitting component reduces the problems discussed hereinabove. For purposes of discussion in this description, the "input impedance" of an integrated circuit component is understood to be the impedance of the integrated circuit component as see from the bus, and integrated circuit components are understood to be similar in characteristic input impedances when the values of their respective input impedances are within approximately 5–10% of each other.

Similarly, for communications systems having groups of integrated circuit components along the bus between the signal transmitting component and the signal receiving component wherein intra-group components have similar characteristic input impedances, coupling damping impedances to the first component in the direction of signal travel to the destination component within the respective group adjusts the input impedances of the respective integrated circuit components as seen from the bus in such a way to effectively reduce the signal distortion and ringing problems discussed hereinabove. Such coupling arrangement is suitable for use not only when the intra-group components are coupled adjacent to one another along the bus between the signal transmitting component and the signal receiving component but also when components from one group are interleavingly coupled or randomly interspersed with components from other groups along the bus between the signal transmitting component and the signal receiving component.

However, the characteristic input impedances of integrated circuit components within a communications system typically differ from one another. Moreover, often it is not known how many integrated circuit components will be included in the same communications system and/or what the characteristic input impedances of those components are. Therefore, embodiments of the invention also are able to determine suitable or advantageous damping impedance configurations for the integrated circuit components within the communications system and actuate an accompanying, controllable arrangement of damping impedance elements accordingly.

Figure 4:
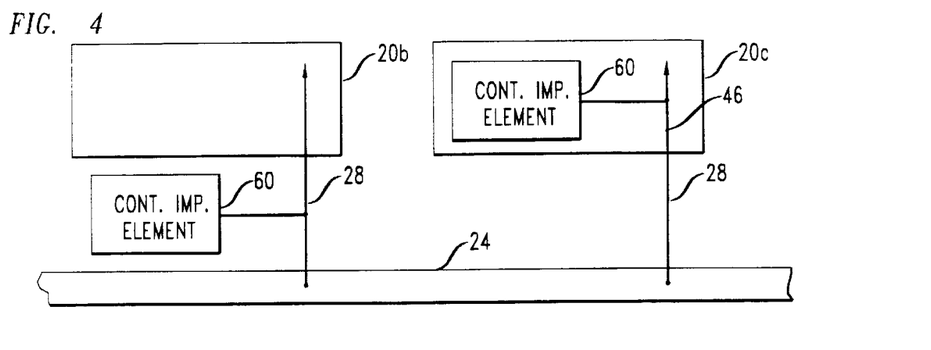
FIG. 4 is a schematic diagram of a portion of a communications system according to an embodiment of the invention.

Referring now to FIG. 4, a portion of an arrangement according to embodiments of the invention is shown schematically. A communications system is formed by a plurality of integrated circuit components including, e.g., components $20_a$–$20_p$, which, except for the novel impedance coupling arrangement described herein, are similar to the integrated circuit components shown in FIG. 1. Such integrated circuit components include, e.g., BGA packages, PGA packages, multi-chip modules (MCMs) and plastic molded devices.

Coupled to integrated circuit components 20 are a plurality of controllable or switchable impedance elements (shown generally as 60) according to one or more embodiments of the invention. As shown, the controllable impedance element 60 is suitable for coupling either externally to the integrated circuit component (as shown with integrated circuit component $20_b$) or internally within the integrated circuit component (as shown in integrated circuit component $20_c$). External controllable impedance elements are coupled, e.g., to stub 28 in the manner shown. Internal controllable impedance elements 60 are coupled, e.g., to interface 46, which couples the integrated circuit component $20_c$ with external circuitry such as stub 28.

Figure 5:
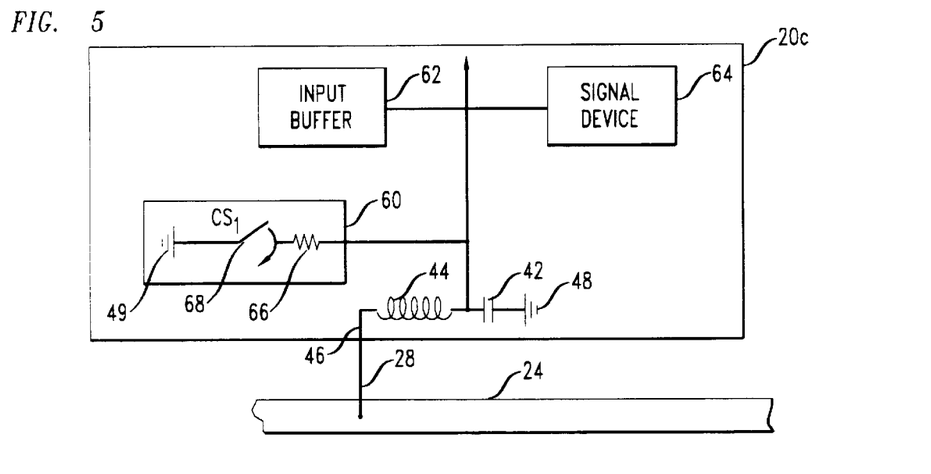
FIG. 5 is a schematic diagram of the integrated circuit component model $20_c$ of FIG. 4 showing a damping impedance coupled thereto according to an embodiment of the invention.
Figure 6:
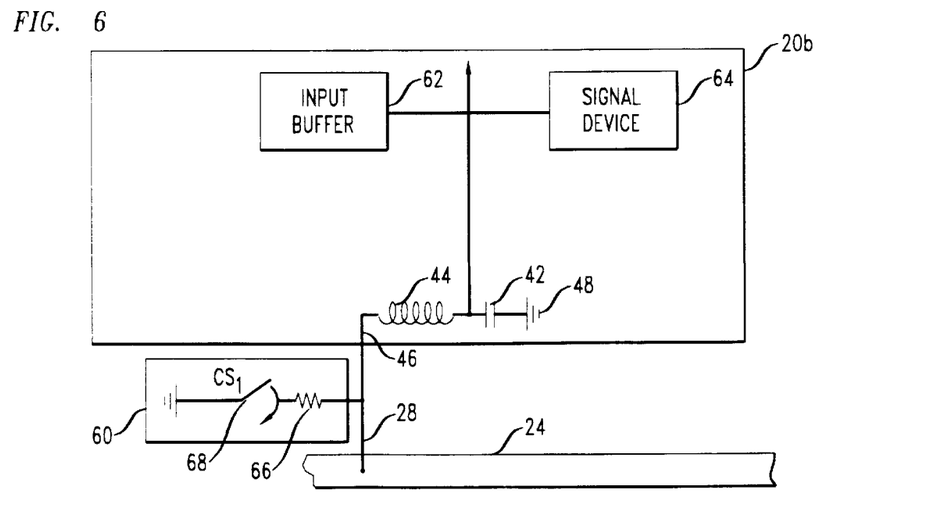
FIG. 6 is a schematic diagram of the integrated circuit component model $20_b$ of FIG. 4 showing a damping impedance coupled thereto according to an alternative embodiment of the invention.

FIGS. 5–6 show individual integrated circuit components of the kind shown in FIG. 4, i.e., integrated circuit components employing controllable impedance elements 60 according to embodiments of the invention. FIG. 5 illustrates an integrated circuit component $20_c$ having a controllable damping impedance element 60 disposed internally within integrated circuit component $20_c$. In an alternative embodiment, FIG. 6 illustrates an integrated circuit component $20_b$ having an externally disposed, controllable damping impedance element 60.

Both integrated circuit components $20_b$ and $20_c$ include, e.g., an input buffer 62 and a signal driver 64. Also, as discussed previously herein, integrated circuit components $20_b$ and $20_c$ have associated therewith an inherent characteristic capacitance (shown schematically as capacitor 42) and characteristic inductance (shown schematically as inductor 44). Although the integrated circuit components are shown having a signal driver, it should be understood that it is suitable for embodiments of the invention to use integrated circuit components that only receive signals and thus do not have signal drivers. Furthermore, it is possible for embodiments of the invention to use signal driver configurations other than those shown.

In FIG. 5, the internal, controllable impedance element 60 is coupled to an interface (shown as 46) through inductance 44. Interface 46 is, e.g., a metal trace or other suitable electrically-conducting element that enables electrical connection of internal components of integrated circuit component 20c to external circuitry such as stub 28. Components internal to integrated circuit component 20c include, e.g., input buffer 62, signal driver 64, controllable impedance element 60 and other circuitry and components not shown. In FIG. 6, controllable impedance element 60 is coupled external to component $20_b$ via connection to stub 28.

The controllable impedance element 60 in both integrated circuit components $20_b$ and $20_c$ is configured to selectively provide an appropriate impedance to dampen the effects of the characteristic input impedance of the integrated circuit component on signals propagating on bus 24. Accordingly, the controllable impedance element 60 is represented schematically by an impedance element 66 and a switch 68 connected as shown to interface 46. When included in the packaged component, as shown in FIG. 5, impedance element 60 is connected to interface 46 through inductance 44.

In operation, a control signal (shown as CS1) or other appropriate activator positions switch 68 between a closed or enabled position whereby damping impedance 66 is coupled to the integrated circuit component and an open position whereby damping impedance 66 is disabled or effectively removed from the integrated circuit component without disturbing its normal operation. The control switch is formed, e.g., by the combination of active devices or an active device and a passive device. Also, the values of devices such as voltage source 48 and impedance element 66 are selected, e.g., based on the desired signals levels to be transmitted on bus 24. For example, for a communications system having a bus impedance of $Z_0$, impedance element 66 typically has a value within the range from approximately $2Z_0$ to $4Z_0$.

Other suitable switchable impedance arrangements for impedance arrangement 60 include passive element configurations as well as active impedance elements that are capable of performing both the switching function and the appropriate impedance value(s), such as the active resistive devices described in, e.g., U.S. Pat. Nos. 5,194,765; 5,243,249 and 5,298,800, which are assigned to the assignee of this invention and incorporated by reference herein.

In the arrangements shown in FIGS. 5–6, suitable impedance elements 66 include, e.g., a resistor, a resistor-inductor combination and/or a resistor-capacitor combination. Suitable switching elements 66 include, e.g., a conventional integrated circuit transistor switch. Furthermore, it should be understood that embodiments of the invention include the use of multiple impedance elements employed in parallel, cascaded or series configuration, in addition to individual impedance elements, to provide the desired switchable impedance value.

Figure 7:
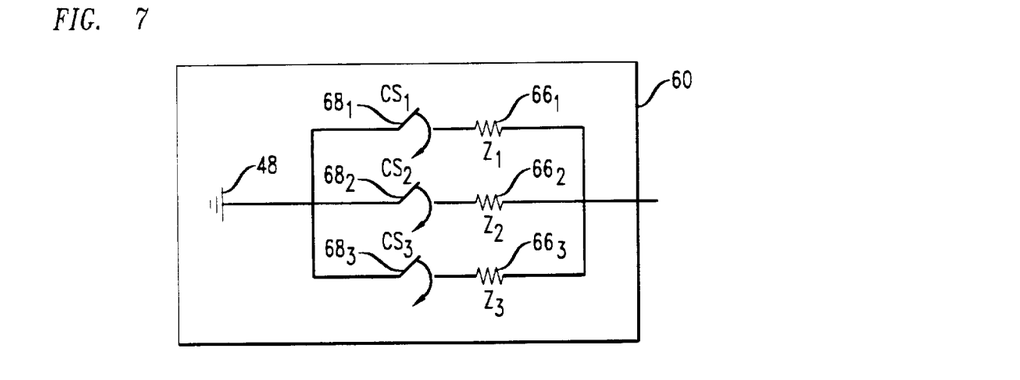
FIG. 7 is a schematic diagram of a controllable impedance arrangement according to an embodiment of the invention.

Referring now to FIG. 7, a schematic diagram of an alternative impedance arrangement 60 is shown. Impedance arrangement 60 has a plurality of impedance elements (e.g., $66_1$, $66_2$ and $66_3$) and a corresponding plurality of switches (e.g., $68_1$, $68_2$ and $68_3$). Impedance elements $66_1$, $66_2$ and $66_3$ have impedance values $Z_1$, $Z_2$ and $Z_3$, respectively. The arrangement 60 is coupled to, e.g., interface 46 (see discussion of FIG. 5, above) or to stub 28 (see discussion of FIG. 6, above), depending on whether arrangement 60 is connected internal or external to integrated circuit component 20. A plurality of control signals or other appropriate controls (e.g., shown as CS1, CS2 and CS3, respectively) operate to position corresponding switches $68_1$, $68_2$ and $68_3$ between a closed position whereby the particular impedance element 66 is coupled to integrated circuit component 20 and an open position whereby the particular impedance element 66 is disabled from integrated circuit component 20 without disturbing the normal operation of the integrated circuit component 20.

For example, closing switch $68_3$ couples a damping impedance of $Z_3$ to the particular integrated circuit component 20 having impedance arrangement 60 connected thereto. Also, if more than one switch 68 is closed, the parallel combination of the appropriate impedance elements 66 is coupled to the integrated circuit component 20 of interest. That is, if switches $68_2$ and $68_3$ are closed, the parallel combination of impedance elements $Z_2$ and $Z_3$ is coupled to integrated circuit component 20. In this manner, the arrangement shown in FIG. 7 makes it possible to couple individual or multiple impedance elements 66 in parallel to the integrated circuit component of interest, thus increasing the potential flexibility of an integrated circuit component by allowing one of a number of various effective damping impedance values to be coupled to the integrated circuit component 20 of interest.

As discussed generally hereinabove, for a communications system 10 having integrated circuit components 20 with groups having respective, approximately similar characteristic impedances, signal distortion and ringing along bus 24 effectively are reduced by coupling a damping impedance to the component of each group that is adjacent or closest along the bus to the signal transmitting component and that is also between the signal transmitting component and the signal receiving component.

Figure 8A:
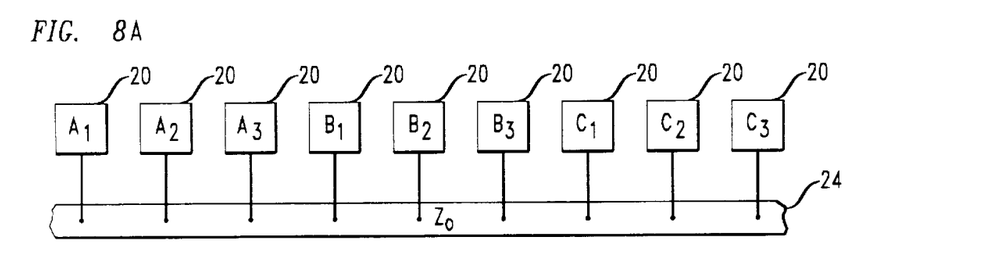
FIGS. 8a and 8b are schematic diagrams of portion of a communications system according to an embodiment of the invention.

For example, consider a communications system shown generally in FIG. 8$a$, where a first group of "A" components $A_1$, $A_2$ and $A_3$ have similar characteristic input impedances, a second group of "B" components $B_1$, $B_2$ and $B_3$ each have characteristic input impedances similar to each other but different than those of the "A" components, and a third group of components $C_1$, $C_2$ and $C_3$ each have input impedances similar to each other but different than those of the "A" and "B" components. According to embodiments of the invention, in such a system arrangement, signal distortion and ringing are reduced by coupling a damping impedance to components $A_1$, $B_1$ and $C_1$.

Figure 8B:
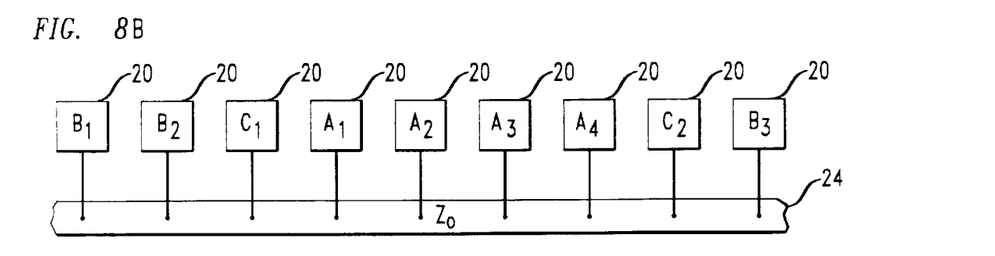

Similarly, for communications systems 10 having more than one group of components with respective similar characteristic impedances whose individual components are arranged in any order, interleaved or otherwise, between the signal transmitting component and the signal receiving component, coupling of damping impedances of the first component in the direction of signal travel to the destination component within each respective group tends to reduce the overall signal distortion and ringing in the communications system. Thus, as shown in FIG. 8$b$, when components from one group are interleavingly coupled or randomly interspersed with components from another group along the bus between the signal transmitting component and the signal receiving component, signal distortion and ringing are reduced by coupling a damping impedance to components $B_1$, $C_1$ and $A_1$.

The desired damping impedance arrangement represents a compromise between the advantages of reduced distortion and reduced ringing and the disadvantages of increased power dissipation, both of which are the result of coupling additional damping impedances to select integrated circuit components with the communications system. In many applications, coupling a damping impedance to the integrated circuit component immediately adjacent the signal transmitting component as discussed hereinabove reduces signal distortion sufficiently. In such arrangement, the overall power dissipation of the communications system is reduced advantageously compared to prior art arrangements, wherein most if not all of the integrated circuit components have terminating impedances associated therewith.

It is apparent from the aforementioned uncertainty of the communication system and the components therein that damping impedance determinations need to be made in response to an assessment of the particular characteristic input impedances of the integrated circuit components being used within the communications system of interest. Such determination should be timely, preferably in real-time once the specific configuration of integrated circuit components within the particular communications system has been established.

Figure 9:
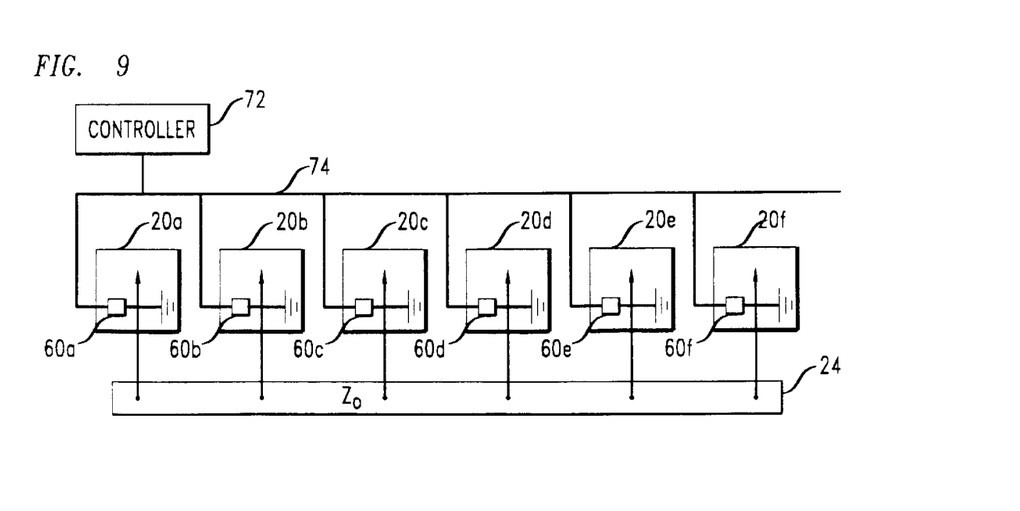
FIG. 9 is a schematic diagram of a communications system according to an embodiment of the invention.

Referring now to FIG. 9, a communications system 10 is shown according to an embodiment of the invention. Communications system 10 includes integrated circuit components 20$_a$–20$_f$ having respective controllable impedance elements 60$_a$–60$_f$ (shown generally) coupled therein. In this arrangement, a controller 72 is coupled, via an appropriate connection 74, to controllable impedance elements 60$_a$–60$_f$ in the manner shown to provide control signals thereto for selective actuation of damping impedance elements 60$_a$–60$_f$.

Furthermore, according to embodiments of the invention, controller 72 recognizes, e.g., which integrated circuit component 20 is to be transmitting data signal(s) on bus 24, which integrated circuit component is to be receiving the transmitted data signal(s), which integrated circuit component(s) are coupled along bus 24 between the signal transmitting component and the signal receiving component, which of the non-transmitting and non-receiving components are to have damping impedances coupled thereto, and what the value(s) of those damping impedances should be. The damping impedance information is ascertained, e.g., by controller 72 determining the effect that one or more of integrated circuit components 20$_a$–20$_f$ has on the integrity of possible signal transmission combinations among the integrated circuit components 20$_a$–20$_f$ within communications system 10. Such information is determinable in a conventional manner via observation of a series of test signal transmissions from each integrated circuit component to every other integrated circuit component.

More specifically, controller 72 causes a test signal to propagate along bus 24 from a specified transmitting component to a specified receiving component. Then, controller 72 or other appropriate instrumentality connected to controller 72 compares the received test signal to the transmitted test signal to determine what effect other integrated circuit components, namely integrated circuit components coupled along bus 24 between the specified transmitting and receiving integrated circuit components, may have had on the test signal transmission. The information is cataloged in a conventional manner. Such activity is repeated in this manner for other possible signal transmission combinations.

Controller 72 then determines the appropriate damping impedances, if any, to be coupled to each of the integrated circuit components for each signal transmission possibility. During normal operation of the communications system, controller 72 accesses the compiled information as needed for proper coupling of damping impedances to the appropriate integrated circuit components 20 and reconfigures the network for the optimal data transfer configuration.

For example, in the context of communications system 10 as shown, controller 72 causes a first test signal to be transmitted, e.g., from integrated circuit component 20$_a$ to integrated circuit component 20$_c$. Controller 72 compares the integrity of the test signal received by 20$_c$ to the original transmitted test signal to determine what effect integrated circuit component 20$_b$ has on a signal transmission from integrated circuit component 20$_a$ to integrated circuit component 20$_c$. Similarly, controller 72 has another test signal transmitted, e.g., from integrated circuit component 20$_a$ to integrated circuit component 20$_d$ to determine the effect that integrated circuit components 20$_b$ and 20$_c$ have on the integrity of such signal transmission.

Once test signal transmission from integrated circuit component 20$_a$ is completed, controller 72 has appropriate test signals transmitted from integrated circuit component 20$_b$ to other integrated circuit components in communications system 10. Such activity is continued in this manner until a sufficient amount of test data is compiled.

Alternatively, controller 72 determines the administration of the appropriate damping impedance(s) just prior to actual signal transmission. For example, if integrated circuit component 20$_b$ is to transmit a signal to integrated circuit component 20$_e$, controller 72 initially causes a terminating impedance to be coupled to the end components, i.e., components 20$_a$ and 20$_f$. Then, controller 72 initiates transmission of a test signal from signal transmitting component $20_b$ to signal receiving component $20_e$. Upon observing the behavior of the integrated circuit components $20_c$ and $20_d$ (i.e., the integrated circuit components between the signal transmitting component and the signal receiving component), controller 72 determines whether either one or both of integrated circuit components $20_c$ and $20_d$ will have damping impedances coupled thereto and what the respective damping impedances values will be.

For example, if controller 72 observes, e.g., that a test signal transmitted from integrated circuit component $20_b$ to integrated circuit component $20_e$ is distorted greatly by integrated circuit component $20_c$ and distorted very little by integrated circuit component $20_d$, controller 72 will, e.g., notify impedance element $60_c$ to cause an appropriate damping impedance to be coupled to integrated circuit component $20_c$ and perhaps an appropriate damping impedance to be coupled to integrated circuit component $20_d$.

However, it is likely that, in this example, controller 72 will determine the incremental increase in power dissipation brought about by coupling a damping impedance to integrated circuit component $20_d$ more than offsets any incremental improvement in signal integrity resulting from coupling a damping impedance to integrated circuit component $20_d$. Accordingly, controller 72 will not notify impedance element $60_d$ not to couple a damping impedance to integrated circuit component $20_d$.

Once the appropriate damping impedance(s) have been coupled to the appropriate integrated circuit components for improved signal integrity, communications system 10 operates in its normal manner in transmitting signal information from integrated circuit component $20_b$ to integrated circuit component $20_e$.

It should be understood that, although embodiments of the invention are shown and described herein with communications systems having open loop bus structures, embodiments of the invention are suitable for use in communications systems having other bus structures, including closed loop bus structures. A suitable closed loop bus structure is disclosed, e.g., in co-pending application "Communication System Having A Closed Loop Bus Structure", Ser. No. 08/731,042 (Atty. Docket: Gabara 35-15).

Also, embodiments of the invention are suitable for use in interchip communications adhering to high speed communications standards including, e.g., existing standards such as complementary metal oxide semiconductor (CMOS), emitter-coupled-logic (ECL), transistor-transistor-logic (TLI), Gunning-transceiver-logic (GTL), low-voltage-differential swing (LVDS), pseudo-emitter-coupled-logic (PECL), high-speed-transceiver-logic (HSTL) and stub series terminated logic (SSTL).

It will be apparent to those skilled in the art that many changes and substitutions can be made to the embodiments of the damping impedance arrangements described herein without departing from the spirit and scope of the invention as defined by the appended claims and their full scope of equivalents.

What is claimed is:

1. A method for enhancing the integrity of signals communicated on a signal bus comprising the steps of:
    providing said signal bus having a plurality of components coupled thereto, said components including at least one component capable of transmitting a communications signal on said signal bus to at least one component capable of receiving the transmitted signal, said components including at least one other component coupled to said bus at a location different from and between the coupling location of the transmitting component to said signal bus and the coupling location of the receiving component to said signal bus, said other component having a damping impedance; and
    coupling said damping impedance of said other component to provide an effective impedance on the signal bus between the coupling location of the signal transmitting component to said signal bus and the coupling location of the signal receiving component to said signal bus to reduce distortion of a transmitted signal on said signal bus.

2. The method as recited in claim 1, wherein said providing step provides said other component couled to the bus at a location adjacent to the signal transmitting component along said signal bus.

3. The method as recited in claim 1, wherein said other component includes a controllable impedance element for providing said damping impedance, and wherein said coupling step further comprises actuating said controllable impedance element to provide said damping impedance.

4. The method as recited in claim 1, wherein said coupling step further comprises selectively coupling a particular impedance value for said damping impedance to said other component, said impedance value being determined based on a test signal.

5. The method as recited in claim 1, further comprising, prior to said coupling step, the step of determining the value of said damping impedance to be coupled to at least one of said components, said determining step including the steps of:
    transmitting from said transmitting component to said receiving component at least one test signal on said signal bus arrangement,
    detecting with a controller an amount of distortion in said test signal corresponding to distortion received at said receiving component, and
    determining damping impedances to be coupled at said other component based on the amount of distortion.

6. The method as recited in claim 1, wherein said plurality of components includes at least a first group of other components having a first characteristic input impedance and a second group of other components having a second characteristic input impedance, and wherein said coupling step further comprises providing a damping impedance to at least one component in each group of other components.

7. An arrangement of components, comprising:
    a signal bus;
    a plurality of integrated circuit components coupled to said signal bus, including at least one component capable of transmitting a communications signal to at least one component capable of receiving the transmitted signal,
    said plurality of components including at least one other component coupled to said signal bus at a location different from and between the coupling location of the transmitting component to said signal bus and the coupling location of the receiving component to said signal bus, wherein the at least one other component includes a controllable damping impedance for reducing distortion of a signal transmitted along said signal bus from said transmitting component to said receiving component.

8. The arrangement as recited in claim 7, wherein said other component is coupled to the bus at a location adjacent to the signal transmitting component.

9. The arrangement as recited in claim 7, wherein said controllable damping impedance arrangement includes at least one controllable impedance element.

10. The arrangement as recited in claim 7, wherein said controllable damping impedance further comprises a plurality of controllable damping impedance elements adapted for selectively providing one or more of said controllable damping impedances, wherein the effective value of the controllable damping impedance is based on which of said plurality of damping elements is provided.

11. The arrangement as recited in claim 7, wherein said plurality of components includes at least a first group of other components having a first characteristic input impedance and a second group of other components having a second characteristic input impedance, and wherein said plurality of components provides damping impedances coupled to at least one component in each group of other components.

12. The arrangement as recited in claim 7, wherein said plurality of components is capable of transmitting and receiving a communications signal in accordance with at least one of complementary metal oxide semiconductor (CMOS), emitter-coupled-logic (ECL), transistor-transistor-logic (TTL), Gunning-transceiver-logic (GTL), low-voltage-differential swing (LVDS), pseudo-emitter-coupled-logic (PECL), high-speed-transceiver-logic (HSTL) and stub series terminated logic (SSTL) standards.

* * * * *